United States Patent [19]
Hinata et al.

[11] 3,985,563
[45] Oct. 12, 1976

[54] SILVER HALIDE PHOTOGRAPHIC EMULSION

[75] Inventors: Masanao Hinata; Haruo Takei; Akira Sato; Tadashi Ikeda, all of Minami-ashigara, Japan

[73] Assignee: Fuji Photo Film Co., Ltd., Minami-ashigara, Japan

[22] Filed: Sept. 9, 1975

[21] Appl. No.: 611,753

[30] Foreign Application Priority Data
Sept. 9, 1974 Japan............................ 49-103726

[52] U.S. Cl. ............................ 96/69; 96/100; 96/124; 96/131; 96/132
[51] Int. Cl.² ............................................ G03C 1/14
[58] Field of Search ............... 96/124, 131, 132, 68, 96/69, 100

[56] References Cited
UNITED STATES PATENTS

| | | | |
|---|---|---|---|
| 3,149,105 | 9/1964 | Lariue et al. | 96/132 |
| 3,672,898 | 6/1972 | Schwan et al. | 96/124 |
| 3,752,670 | 8/1973 | Needler et al. | 96/132 |
| 3,847,613 | 11/1974 | Sakazume et al. | 96/132 |

*Primary Examiner*—J. Travis Brown
*Attorney, Agent, or Firm*—Sughrue Rothwell, Mion, Zinn and Macpeak

[57] ABSTRACT

A silver halide photographic emulsion containing, in supersensitizing amounts, at least one sensitizing dye represented by the following General Formula (I):

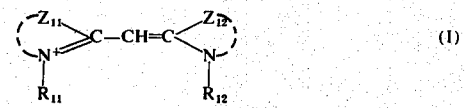

in which $Z_{11}$ represents an atomic group necessary for completing a pyridine or quinoline nucleus; $Z_{12}$ represents an atomic group necessary for completing an oxazole, benzoxazole, naphthoxazole, imidazole, benzimidazole or naphthimidazole nucleus; and $R_{11}$ and $R_{12}$ each represents an aliphatic group and at least one of $R_{11}$ and $R_{12}$ is an aliphatic group containing a carboxy group or a sulfo group; and at least one sensitizing dye represented by the following General Formula (II):

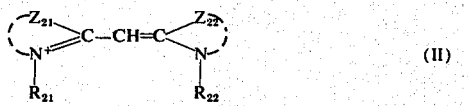

in which $Z_{21}$ represents an atomic group necessary for completing a thiazole, benzothiazole, naphthothiazole, selenazole, benzoselenazole or naphthoselenazole nucleus; $Z_{22}$ represents an atomic group necessary for completing an imidazole, benzimidazole or naphthimidazole nucleus; an $R_{21}$ and $R_{22}$ each represents an aliphatic group, and at least one of $R_{21}$ and $R_{22}$ is an aliphatic group containing a carboxy group or a sulfo group.

17 Claims, 1 Drawing Figure

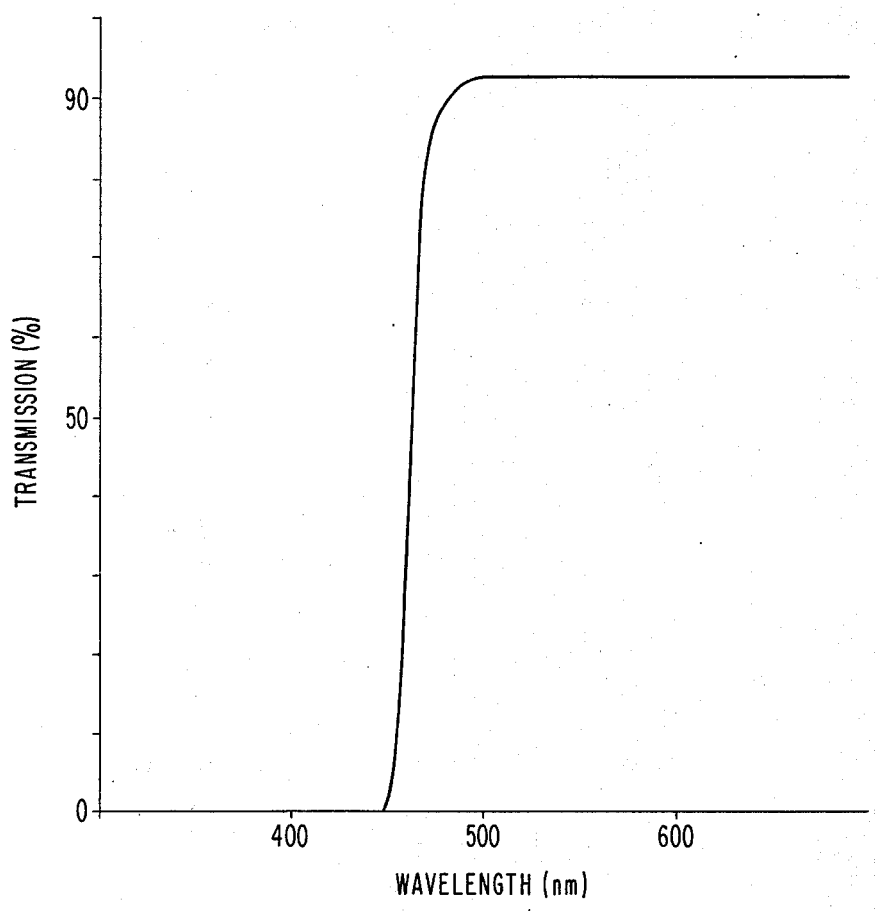

SILVER HALIDE PHOTOGRAPHIC EMULSION

BACKGROUND OF THE INVENTION

1. Field of the Invention

This invention relates to a spectrally sensitized silver halide photographic emulsion and more particularly, it is concerned with a silver halide photographic emulsion supersensitized by a novel combination of sensitizing dyes of two types.

2. Description of the Prior Art

It is well known that the sensitive wavelength range of a silver halide emulsion can be enlarged and spectrally sensitized by adding a sensitizing dye to the silver halide photographic emulsion. In some cases, only one sensitizing dye is used in order to sensitize the emulsion to a desired spectral sensitization wavelength, but two or more sensitizing dyes in combination are used often. When two or more sensitizing dyes are used in combination, the spectral sensitization achieved is between the case of using these sensitizing dyes individually or is often decreased. In some cases, however, the use of a specific combination of sensitizing dyes of different types results in a more marked increase of spectral sensitization than in the case of using the sensitizing dyes individually. This phenomenon is usually called "supersensitization".

When such a combination is used, the spectral sensitization wavelength is intermediate or a mere combination of the spectral sensitization wavelength obtained when the sensitizing dyes are used individually, but sometimes a shift of the spectral sensitization occurs to a wavelength which cannot be predicted from the spectral sensitization properties when the sensitizing dyes are used individually.

Thus, discovery of combinations of sensitizing dyes, which are capable of providing a higher spectral sensitization than in the case of using the sensitizing dyes individually and having a sensitization wavelength region suitable for the intended use of the photographic light-sensitive material, is very important in the spectral sensitization techniques of silver halide photographic emulsions.

In the combination of sensitizing dyes used for obtaining supersensitization, the sensitizing dyes must strictly be chosen since supersensitization is markedly affected even by an apparently small difference in chemical structure. That is to say, which combination of sensitizing dyes will be capable of providing supersensitization cannot readily be predicted from the chemical structures only.

The sensitizing dyes used in supersensitization of a silver halide photographic emulsion must not interact with other photographic additives and have stable photographic properties even after storage of the photographic lightsensitive material.

Another requirement for the sensitizing dyes used is that no residual coloration due to the sensitizing dyes must remain in the light-sensitive material after processings. In processing in a short time (from about 3 to about 90 seconds) such as rapid processing, in particular, a residual coloration must not be retained. Residual coloration is particularly disadvantageous in photographic papers, since a bright white color can not be obtained in black-and-white photography and reproduction of real colors is impossible in color photography.

It is well known as described in U.S. Pat. Nos. 3,752,670 and 3,480,434, German Patent Application (OLS) No. 2,303,204 and Japanese Patent Publication No. 30023/1971 to use sensitizing dyes in order to increase the sensitivity in the blue color region, but the photographic properties of the sensitizing dyes used in this sensitization of the blue color region are not sufficient. That is to say, the simple merocyanine dyes described in U.S. Pat. No. 3,480,434 and Japanese Patent Publication No. 30023/1971 have the disadvantage that the spectral sensitivity distribution of the silver halide emulsion is extended to a long wavelength side and the green region is also sensitized. This deteriorates the color reproduction in a multi-layer color photographic material. If a yellow filter layer is provided on the blue-sensitive layer so as to overcome this disadvantage, the sensitivity of the green region can be reduced to some extent, but, at the same time, the sensitivity of the blue region is also reduced, which is disadvantageous. Some of the monomethinecyanine dyes described in U.S. Pat. No. 3,752,670 and German Patent Application (OLS) No. 2,303,204 show a sharp J-band sensitization, but, have the disadvantage that the residual coloration is large. Therefore, an improved photographic emulsion is required in which the long wavelength side of spectral sensitization region in the blue region is sharply cut and the photographic element processed is scarcely dye-contaminated.

SUMMARY OF THE INVENTION

An object of the invention is to provide a silver halide photographic emulsion that has spectral sensitivity characteristics in which the long wavelength side in the spectrally sensitized region is sharply cut and in which the emulsion is spectrally sensitized in the blue region.

Another object of the invention is to provide a silver halide photographic emulsion that is spectrally sensitized by a combination of dyes having a supersensitizing effect, which produce little dye-contamination in the processed photographic element.

A further object of the invention is to provide excellent color reproducibility and a high sensitivity multi-layer color photographic material which has a blue-sensitive layer of a photographic emulsion with little overlap with the spectral sensitivity of a green-sensitive layer and which is spectrally sensitized to a large extent in the blue light region.

A still further object of the invention is to provide a silver halide photographic emulsion sensitized by a combination of dyes having a supersensitizing effect, which spectral sensitivity is not reduced during dissolving of the emulsion or during storage of the light-sensitive material before processing even in the presence of an anionic compound (in particular, a gelatin flocculant) or a color coupler.

The above-described objects of the invention are accomplished with a silver halide photographic emulsion containing, in supersensitizing amounts, at least one sensitizing dye represented by General Formula (I):

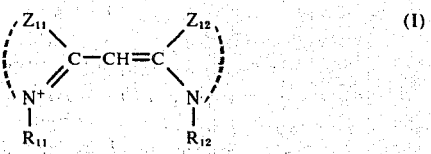

in which $Z_{11}$ represents an atomic group necessary for completing a pyridine or quinoline nucleus; $Z_{12}$ represents an atomic group necessary for completing an oxazole, benzoxazole, naphthoxazole, imidazole, benzimidazole or naphthimidazole nucleus; and $R_{11}$ and and $R_{12}$ each represents an aliphatic group and at least one of $R_{11}$ and $R_{12}$ is an aliphatic group containing a carboxy group or a sulfo group; and at least one sensitizing dye represented by General Formula (II):

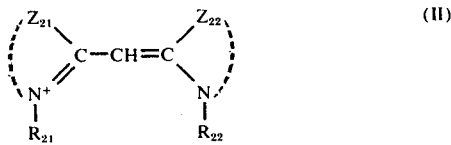

in which $Z_{21}$ represents an atomic group necessary for completing a thiazole, benzothiazole, naphthothiazole, selenazole, benzoselenazole or naphthoselenazole nucleus; $Z_{22}$ represents an atomic group necessary for completing an imidazole, benzimidazole or naphthimidazole nucleus; and $R_{21}$ and $R_{22}$ each represents an aliphatic group, and at least one of $R_{21}$ and $R_{22}$ is an aliphatic group containing a carboxy group or a sulfo group.

BRIEF DESCRIPTION OF THE DRAWING

The FIGURE shows a spectral transmission curve of an SC-46 Filter manufactured by the Fuji Photo Film Co., Ltd., used in Example 1.

DETAILED DESCRIPTION OF THE INVENTION

In the formula (I), $Z_{11}$ represents an atomic group necessary for completing a pyridine or quinoline nucleus and $Z_{12}$ represents an atomic group necessary for completing an oxazole, benzoxazole, naphthoxazole, imidazole, benzimidazole or naphthimidazole nucleus. These nuclei can be substituted with one or more substituents in other positions than the nitrogen atoms, for example, a halogen atom such as chlorine, bromine and fluorine atoms, an alkyl group having 4 or less carbon atoms such as methyl, ethyl, butyl, isopropyl and sec-butyl groups, an alkoxy group having 4 or less carbon atoms such as methoxy, ethoxy, propoxy and isobutoxy groups, a hydroxyl group, a carboxy group, an alkoxycarbonyl group having 4 or less carbon atoms such as methoxycarbonyl and ethoxycarbonyl groups, a substituted alkyl group such as trifluoromethyl, benzyl, phenethyl and α-methylphenethyl groups, an aryl group such as a phenyl group and a substituted aryl group such as p-tolyl, 2,3-xylyl, m-cumenyl and p-ethylphenyl groups.

Examples of heterocyclic nuclei completed by $Z_{11}$ are pyridine, 4-chloropyridine, 5-bromopyridine, 4-fluoropyridine, 4-methylpyridine, 5-ethylpyridine, 5-methoxypyridine, 4-ethoxypyridine, 4-trifluoromethylpyridine, quinoline, 5-chloroquinoline, 6-bromoquinoline, 7-fluoroquinoline, 5-methylquinoline, 6-methylquinoline, 6-ethylquinoline, 5-methoxyquinoline, 6-ethoxyquinoline and 6-trifluoromethylquinoline nuclei.

Examples of heterocyclic nuclei completed by $Z_{12}$ are oxazole, 4-chloroxazole, 4-bromoxazole, 4-methyloxazole, 4-phenyloxazole, 4,5-dimethyloxazole, benzoxazole, 5-chlorobenzoxazole, 5-bromobenzoxazole, 5-fluorobenzoxazole, 5-methylbenzoxazole, 6-ethylbenzoxazole, 4,5-dimethyloxazole, 5-phenyloxazole, 5-phenethylbenzoxazole, 5-t-butylbenzoxazole, 5,6-dimethylbenzoxazole, 5-trifluoromethylbenzoxazole, 5-chloro-6-methylbenzoxazole, 5-methoxybenzoxazole, 5-ethoxybenzoxazole, 6-methoxybenzoxazole, 5-phenoxybenzoxazole, 5-methoxycarbonylbenzoxazole, naphth(1,2-d)oxazole, naphth(2,3-d)oxazole, 5-chloronaphth(1,2-d)oxazole, naphth(2,1-d)oxazole, 5-bromonaphth(1,2-d)oxazole, 6-bromonaphth(2,3-d)oxazole, 7-fluoronaphth(2,1-d)oxazole, 5-methylnaphth(1,2-d)oxazole, 6-ethylnaphth(2,1-d)oxazole, 5-methoxy(2,3-d)oxazole, 7-ethoxynaphth(2,1-d)oxazole, 8-methoxynaphth(2,1-d)oxazole, imidazole, 4-chloroimidazole, 4-bromoimidazole, 4-fluoroimidazole, 4-methylimidazole, 4-ethylimidazole, 4,5-dimethylimidazole, 4-phenylimidazole, benzimidazole, 4-chlorobenzimidazole, 4-bromobenzimidazole, 4-fluorobenzimidazole, 4,5-dichlorobenzimidazole, 4-methylbenzimidazole, 4-ethylbenzimidazole, 4-isopropylbenzimidazole, 4-butylbenzimidazole, 4,5-dimethylbenzimidazole, 4,5-diethylbenzimidazole, 4-trifluoromethylbenzimidazole, 4-methoxybenzimidazole, 4-propoxybenzimidazole, 4-acetylbenzimidazole, 4-methoxycarbonylbenzimidazole, 4-ethoxycarbonylbenzimidazole, 4-butoxycarbonylbenzimidazole, 4-cyanobenzimidazole, 5-methylsulfonylbenzimidazole, 5-ethylsulfonylbenzimidazole, naphth(1,2-d)imidazole, naphth(2,3-d)imidazole, 5-chloronaphth(2,3-d)imidazole, 5-bromonaphth(1,2-d)imidazole, 7-methylnaphth(1,2-d)imidazole and 6-ethylnaphth(2,3-d)imidazole nuclei.

$R_{11}$ and $R_{12}$ each represents aliphatic groups having 8 or less carbon atoms, including saturated and unsaturated aliphatic hydrocarbon groups, in which the carbon chains can be interrupted by hetero atoms such as oxygen, sulfur and nitrogen. Examples of situations wherein $R_{11}$ or $R_{12}$ is interrupted by a hetero atom are sulfoalkoxyalkyl (e.g., 3-sulfopropyloxyethyl, 3-methoxy-2-(3-sulfopropoxy)propyl, etc.), sulfoalkylthioalkyl (e.g., 3-sulfopropylthioethyl, etc.), sulfoalkoxyalkoxyalkyl (e.g., 2-[2-(3-sulfopropoxy)ethoxy]ethyl, etc.), carboxyalkoxyalkyl (e.g., 2-(2-carboxyethoxy)ethyl, etc.). The aliphatic group may be substituted with one or more substituents such as a hydroxyl group, an alkoxy group (for example, a methoxy group or an ethoxy group), an alkylcarbonyloxy group (for example, such as an acetoxy group and a propionyloxy group), a phenyl group, a substituted phenyl group (for example, a sulfophenyl group and a chlorophenyl group), carboxy and sulfo groups, with at least one of $R_{11}$ and $R_{12}$ containing a carboxy group or a sulfo group. When both of $R_{11}$ and $R_{12}$ contain a carboxy group or a sulfo group, one of these groups may form a salt with a cation such as an alkali metal ion (e.g., sodium, potassium, etc.), ammonium ion, an organic base such as pyridine, trimethylamine, morpholine, etc., or an onium ion, etc. When the aliphatic group is substituted, the total number of carbon atoms in the aliphatic group plus substituent is up to 8, e.g., with phenyl substitution the aliphatic moiety can contain up to 2 carbon atoms.

Examples of substituted or unsubstituted aliphatic groups with or without a hetero atom which do not contain a carboxy group or a sulfo group are alkyl groups such as methyl, ethyl, propyl, butyl, pentyl, hexyl, octyl, allyl, isobutyl, isohexyl, sec-butyl, etc., hydroxyalkyl groups such as 2-hydroxyethyl, 4-hydroxybutyl, etc., acyloxyalkyl groups such as 2-acetoxyethyl, 3-acetoxypropyl, etc., and alkoxyalkyl groups such as 2-methoxyethyl and 4-methoxybutyl groups.

Examples of aliphatic groups containing a carboxy group or a sulfo group are carboxyalkyl groups such as 2-carboxyethyl, 3-carboxypropyl, 2-(2-carboxyethoxy)ethyl, 2-sulfoethyl, 3-sulfopropyl, 3-sulfobutyl, 4-sulfobutyl, 2-hydroxy-3-sulfopropyl, 2-(3-sulfopropoxy)ethyl, 2-acetoxy-3-sulfopropyl, 3-methoxy-2-(3-sulfopropoxy)propyl, 2-[2-(3-sulfopropoxy)ethoxy]ethyl, and 2-hydroxy-3-(3'-sulfopropoxy)propyl groups. p-Carboxybenzyl, p-sulfobenzyl and p-sulfophenethyl groups can also be used as $R_{11}$ or $R_{12}$.

In the formula (II), $Z_{21}$ represents an atomic group necessary for completing a thiazole, benzothiazole, naphthothiazole, selenazole or benzoselenazole nucleus and $Z_{22}$ represents an atomic group necessary for completing an imidazole, benzimidazole or naphthimidazole nucleus. These nuclei can be substituted with one or more substituents in other positions than at the nitrogen atoms, for example, a halogen atom such as chlorine, bromine and fluorine atoms, an alkyl group having 4 or less carbon atoms such as methyl, ethyl, butyl, isopropyl and sec-butyl groups, an alkoxy group having 4 or less carbon atoms such as methoxy, ethoxy, propoxy and isobutoxy groups, a hydroxyl group, a carboxy group, an alkoxycarbonyl group having 4 or less carbon atoms such as methoxycarbonyl, ethoxycarbonyl and butoxycarbonyl groups, a substituted alkyl group such as trifluoromethyl, benzyl, phenethyl and α-methylphenethyl groups, an aryl group such as a phenyl group, a substituted aryl group such as p-tolyl, 2,3-xylyl, m-cumenyl and p-ethylphenyl groups, and an alkylsulfonyl group having 4 or less carbon atoms such as methylsulfonyl, ethylsulfonyl and propylsulfonyl groups. $R_{21}$ and $R_{22}$ have respectively the same meaning as $R_{11}$ and $R_{12}$ and at least one of $R_{21}$ and $R_{22}$ represents an aliphatic group containing either a carboxy group or a sulfo group.

Examples of heterocyclic nuclei completed by $Z_{21}$ are thiazole, 4-methylthiazole, 4,5-dimethylthiazole, 4-phenylthiazole, 4-(p-tolyl)thiazole, benzothiazole, 4-chlorobenzothiazole, 5-chlorobenzothiazole, 6-chlorobenzothiazole, 7-chlorobenzothiazole, 5-bromobenzothiazole, 6-bromobenzothiazole, 5-iodobenzothiazole, 5-fluorobenzothiazole, 4-methylbenzothiazole, 5-methylbenzothiazole, 6-methylbenzothiazole, 5,6-dimethylbenzothiazole, 5-methoxybenzothiazole, 6-methoxybenzothiazole, 5-ethoxybenzothiazole, 5-hydroxy-6-methylbenzothiazole, 5-carboxybenzothiazole, 5-ethoxycarbonylbenzothiazole, 5-trifluoromethylbenzothiazole, 5-phenylbenzothiazole, 4-phenylbenzothiazole, 5-phenethylbenzothiazole, naphth(1,2-d)thiazole, naphth(2,3-d)thiazole, 5-methylnaphth(1,2-d)thiazole, 7-methylnaphth(1,2-d)thiazole, 7-ethylnaphth(1,2-d)thiazole, 7-methylnaphth(2,1-d)naphthothiazole, 5-methoxy(1,2-d)naphthothiazole, 7-ethoxynaphtho(2,1-d)thiazole, 8-methoxynaphth(2,3-d)thiazole, 8-chloronaphtho(1,2-d)thiazole, selenazole, benzoselenazole, 5-chlorobenzoselenazole, 5-methylbenzoselenazole, 5-hydroxybenzoselenazole, 5-methoxybenzoselenazole, naphth(1,2-d)selenazole, naphth(2,1-d)selenazole, naphth(2,3-d)selenazole, 8-chloronaphth(1,2-d)selenazole and 7-methylnaphth(1,2-d)selenazole nuclei.

Examples of heterocyclic nuclei completed by $Z_{22}$ are imidazole, benzimidazole, 5-chlorobenzimidazole, 5,6-dichlorobenzimidazole, 5-methylsulfonylbenzimidazole, 5-acetylbenzimidazole, 5-cyanobenzimidazole, 5-carboxybenzimidazole, 5-ethoxycarbonylbenzimidazole, 5-butoxycarbonylbenzimidazole, naphth(1,2-d)imidazole, naphth(2,1-d)imidazole and naphth(2,3-d)imidazole nuclei.

Particularly useful dyes represented by the General Formula (I) in the present invention are dyes represented by the following General Formula (III):

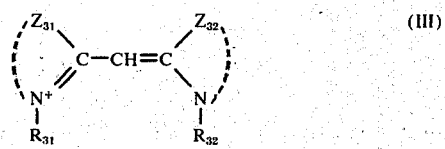

In this formula (III), $Z_{31}$ represents an atomic group necessary for completing a pyridine or quinoline nucleus both as heretofore described for $Z_{11}$, and $Z_{32}$ represents an atomic group necessary for completing an oxazole, benzoxazole, naphthoxazole, benzimidazole or naphthimidazole nucleus all as heretofore described for $Z_{12}$. These nuclei can be substituted with one or more substituents other than $R_{31}$ and $R_{32}$ on the nitrogen atom, examples of which are similar to those described in General Formula (I). $R_{31}$ is an alkyl group having 4 or less carbon atoms, which can be substituted with a hydroxyl group, such as methyl, ethyl, propyl, butyl, isopropyl or 2-hydroxyethyl group or a group represented by $-A_{31}-COOH$ or $-A_{31}-SO_3H$ in which $A_{31}$ represents an alkylene group having 4 or less carbon atoms, which can be substituted with a hydroxyl group such as methylene, ethylene, trimethylene, tetramethylene, propylene, 1-methyl-1,3-propylene, 2-methyl-1,3-propylene or 2-hydroxy-1,3-butylene group. $R_{32}$ is a group represented by $-A_{32}-COOH$ or $-A_{32}-SO_3H$ in which $A_{32}$ has the same meaning as $A_{31}$.

Particularly useful dyes of the sensitizing dyes represented by General Formula (III) are represented by the following General Formula (V):

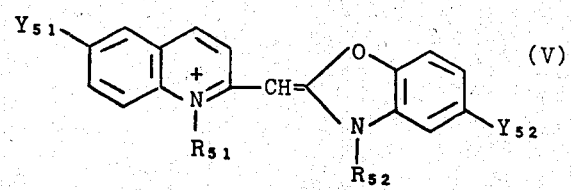

In this formula (V), $R_{51}$ and $R_{52}$ have the same meaning as $R_{31}$ and $R_{32}$ respectively. $Y_{51}$ represents a hydrogen atom, a halogen atom such as a chlorine or bromine atom, an alkyl group having 4 or less carbon atoms such as a methyl, ethyl, butyl, isopropyl or t-butyl group, or an alkoxy group having 4 or less carbon atoms such as methoxy, ethoxy, butoxy, isopropoxy or sec-butoxy group. $Y_{52}$ has the same meaning as $Y_{51}$.

Particularly useful dyes of the dyes represented by General Formula (II) are represented by the following General Formula (IV):

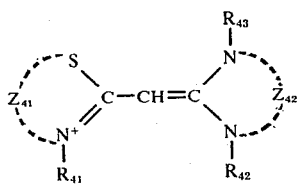
(IV)

In this formula (IV), $Z_{41}$ represents an atomic group necessary for completing a naphthothiazole nucleus as heretofore described for $Z_{21}$, and $Z_{42}$ represents an atomic group necessary for completing a benzimidazole or naphthimidazole nucleus both as heretofore described for $Z_{22}$. These nuclei can be substituted with one or more substituents other than $R_{41}$, $R_{42}$ and $R_{43}$ on the nitrogen atoms, examples of which are similar to those of General Formula (II). $R_{41}$ is an alkyl group having 4 or less carbon atoms, which may be substituted with a hydroxyl group, such as a methyl, ethyl, propyl, butyl, isopropyl or 2-hydroxyethyl group, or a group represented by $-A_{41}-SO_3H$ or $-A_{41}-COOH$ in which $A_{41}$ represents an alkylene group having 4 or less carbon atoms, which may be substituted with a hydroxyl group, such as a methylene, ethylene, trimethylene, tetramethylene, propylene or 2-hydroxy-1,3-butylene group. $R_{42}$ is a group represented by $-A_{42}-SO_3H$ or $-A_{42}-COOH$ in which $A_{42}$ has the same meaning as $A_{41}$. $R_{43}$ is an alkyl group having 4 or less carbon atoms such as a methyl, ethyl, propyl, butyl or isopropyl group or a substituted alkyl group having 4 or less carbon atoms such as a 2-hydroxyethyl, 4-hydroxybutyl, 2-acetoxyethyl, 3-acetoxypropyl, 2-methoxyethyl or 4-methoxybutyl group.

Particularly useful dyes of the sensitizing dyes represented by General Formula (IV) are represented by the following General Formula (VI):

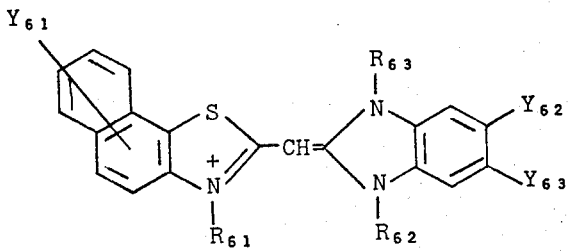

(VI)

and

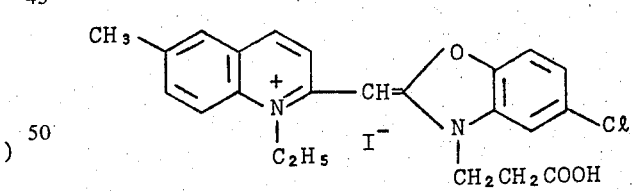

In these formulae, $R_{61}$, $R_{62}$ and $R_{63}$ each has the same meaning as $R_{41}$, $R_{42}$ and $R_{43}$. $Y_{61}$ represents a hydrogen atom, an alkyl group having 4 or less carbon atoms such as a methyl, ethyl, butyl or isopropyl group or a halogen atom such as a chlorine or bromine atom. $Y_{62}$ represents a hydrogen atom or a halogen atom such as a chlorine or bromine atom. $Y_{63}$ represents a hydrogen atom, a halogen atom such as a chlorine or bromine atom, an alkylsulfonyl group having 4 or less carbon atoms such as a methylsulfonyl, ethylsulfonyl or propylsulfonyl group or an alkoxycarbonyl group having 4 or less carbon atoms such as a methoxycarbonyl, ethoxycarbonyl or butoxycarbonyl group.

The dyes represented by General Formulae (I) and (II) are all known compounds which can readily be synthesized by those skilled in the art according to the methods as described in U.S. Pat. Nos. 3,149,105 and 2,238,231, British Patent No. 742,112 and F.M. Hamer, *The Cyanine Dyes and Related Compounds*, Intescience Publications, New York, (1964), page 55 et seq.

Typical examples of sensitizing dyes represented by General Formula (I) used in the present invention are given in the following. However, the present invention is not to be construed as being limited to these examples.

I-1

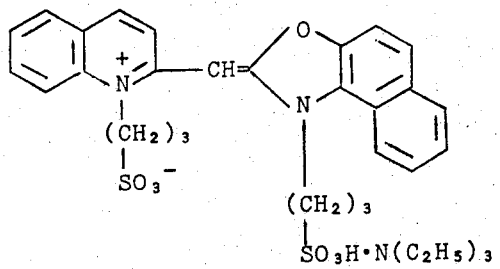

I-2

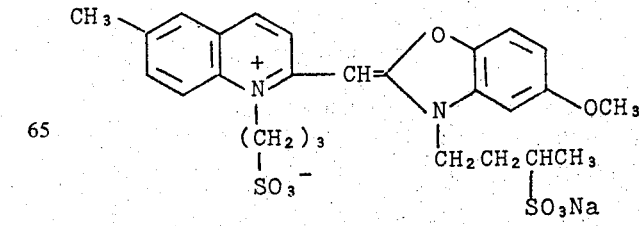

I-3

I-4
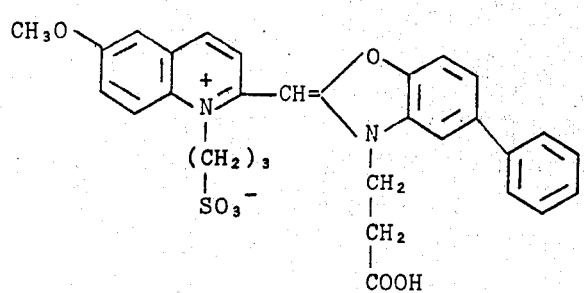
I-5
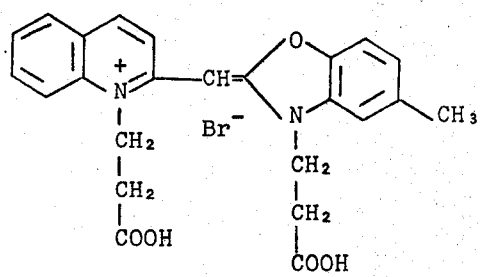
I-6
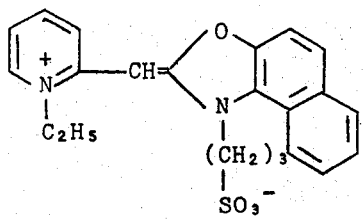
I-7
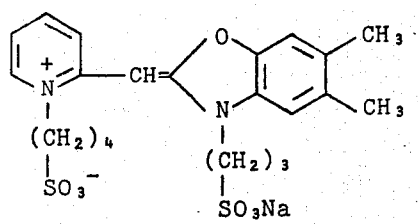
I-8
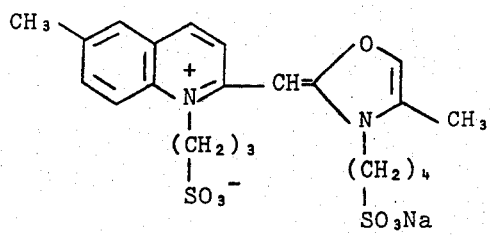
I-9
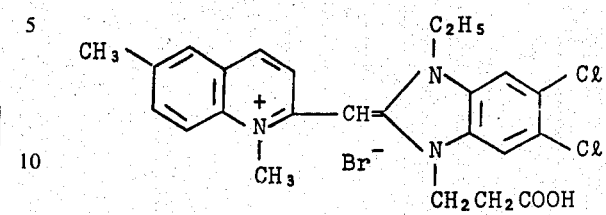
I-10
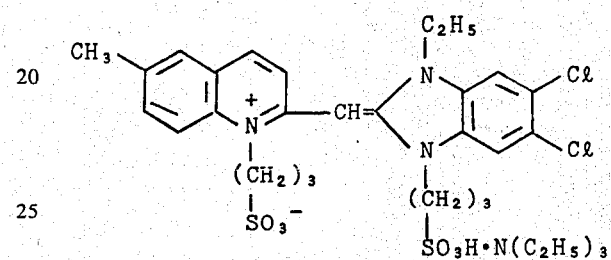
I-11
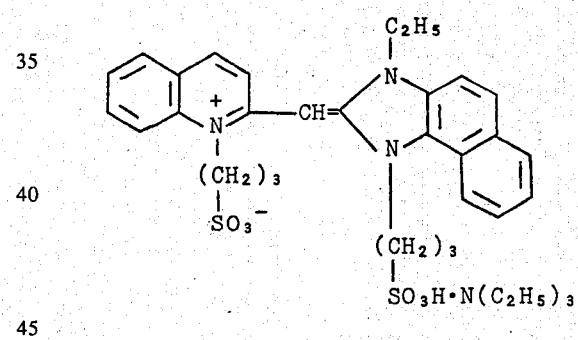
Typical examples of sensitizing dye represented by General Formula (II) used in the present invention are given in the following. However, the present invention is not to be construed as being limited to these examples.
II-1
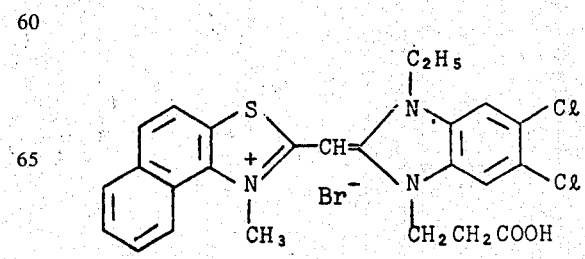

II-2
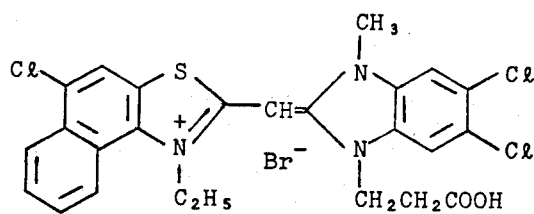
II-3
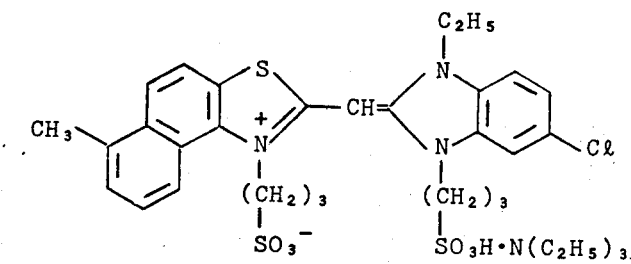
II-4
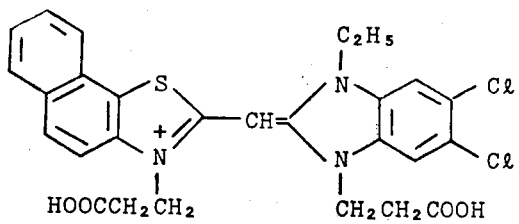
II-5
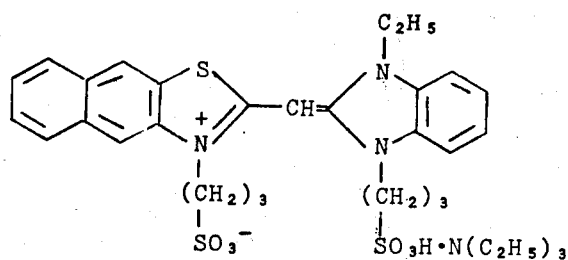
II-6
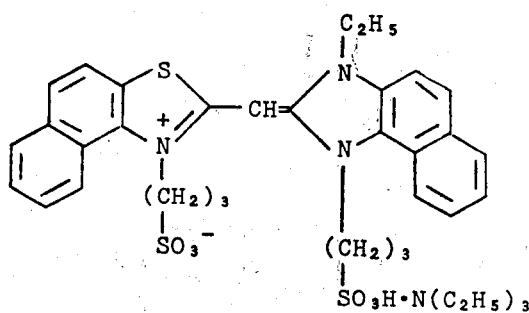

II-7

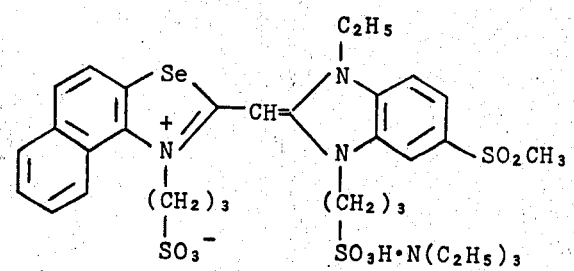

II-8

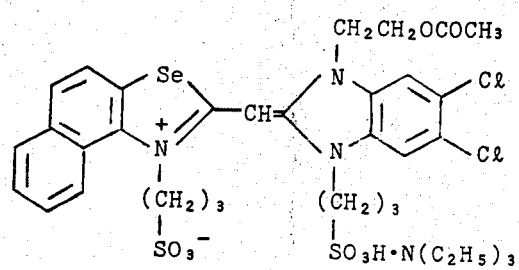

II-9

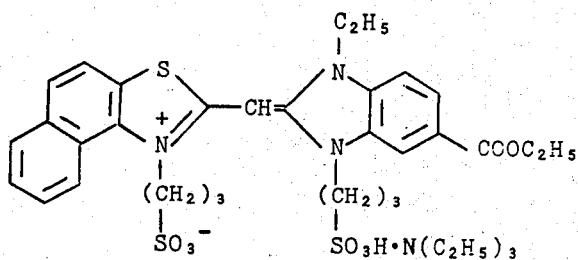

II-10

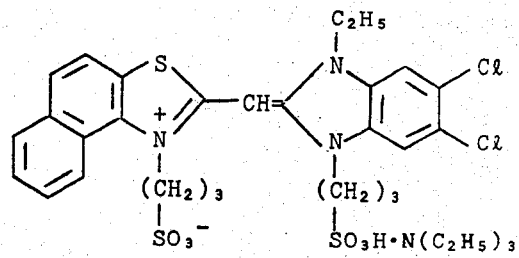

The optimum concentration of a sensitizing dye used in the invention can be determined using the known method wherein the same emulsion is divided into several parts in which the sensitizing dye is incorporated at different concentrations and the sensitivity of each part is then measured.

The quantity of the sensitizing dye to obtain the supersensitization according to the present invention is not particularly limited but, preferably, the amount of each of the dyes of the General Formula (I) and the General Formula (II) is about $2 \times 10^{-6}$ mol to about $1 \times 10^{-3}$ mol per mol of silver halide. A more preferred range is about $5 \times 10^{-6}$ mol to $1 \times 10^{-4}$ mol. The preferred proportion of the dye represented by the General Formula (I) to the dye represented by the General Formula (II) to obtain supersensitization according to the invention is about 20:1 to 1:20, particularly about 10:1 to 1:10 and more particularly about 5:1 to 1:5.

The photographic emulsion of the present invention can contain other sinsitizing dyes than the dyes repreented by the general formulae (I) and (II) or substantially colorless compounds which are known to possess a supersensitizing action within the scope and amount wherein the effect of the combination of the dyes of the present invention is not lost. For example, the photographic emulsion can contain pyrimidylamino group- or triazinylamino group-containing compounds described in U.S. Pat. Nos. 2,933,390, 3,511,664, 3,615,613, 3,615,632, 3,615,641, etc., the aromatic organic acid-formaldehyde condensates described in British Patent 1,137,580, azaindenes or cadmium salts.

The light-sensitive material using the photographic emulsion of the present invention can contain at the same time a spectrally sensitized emulsion and/or a spectrally unsensitized emulsion layer other than the photographic emulsion of the present invention, and the positionwise relationship thereof in the light-sensitive material can be varied according to particular cases.

Processes known in the field of supersensitization can be employed for the addition of the sensitizing dyes to an emulsion.

These sensitizing dyes can be directly dispersed in an emulsion, or can be dissolved in a water-soluble solvent such as pyridine, methyl alcohol, ethyl alcohol, methyl Cellosolve, acetone (or a mixture of such solvents) and, in some cases, diluted with water or dissolved in water, and added to an emulsion as a solution. Also, ultrasonic wave vibration can be used for this dissolution. Further, as is described in U.S. Pat. No. 3,469,987, etc., a process of dissolving the dye in a volatile organic solvent, dispersing this solution in a hydrophilic colloid, and adding the resulting dispersion to an emulsion, or a process of dispersing a water-insoluble dye in a water-soluble solvent without dissolution and adding the resulting dispersion to an emulsion as described in Japanese Patent Publication No. 24185/71 can be used. Also, the dyes can be added to an emulsion by dissolving the dye in an acid solution and dispersing the acid solution in the emulsion. In addition, the processes described in U.S. Pat. Nos. 2,912,345, 3,342,605, 2,996,287, 3,425,835, etc., can be used for the addition to an emulsion.

The process comprising dissolving the sensitizing dyes to be incorporated in combination in the present invention in the same or different solvents and mixing the solutions prior to the addition to a silver halide emulsion is preferably employed. However, if necessary, the sensitizing dyes may be individually dissolved in an appropriate solvent and separately added to an emulsion. The addition of these sensitizing dyes can be effected at any stage during the step of producing an emulsion, but advantageously is effected after the completion of the second ripening prior to the coating of the emulsion on a support.

The silver halide used for the emulsion of the present invention can be any of, for example, silver chloride, silver bromide, silver iodide, silver chlorobromide, silver bromoiodide, and silver chlorobromoiodide. In particular, silver chlorobromide and silver chlorobromoiodide (particularly containing about 1.0 mol % or less silver iodide) are advantageously used.

As a vehicle for the silver halide emulsion of the present invention, gelatin is usually used. However, gelatin can be replaced, partly or completely, by a substance which does not detrimentally influence the light-sensitive silver halide such as a gelatin derivative, albumin, agar-agar, gum arabic, alginic acid, a hydrophilic synthetic resin (e.g., polyvinyl alcohol, polyvinyl pyrrolidone, etc.), a cellulose derivative, etc.

These silver halide emulsions can be coarse grained or fine grained or be a mixture of coarse and fine grains. The silver halide grains can be formed using a known process, e.g., a single jet process, a double jet process or a controlled double jet process.

Also, the crystal structure of the silver halide grains can be uniform throughout the grain or can have a stratum structure wherein the inside and the outside are different from each other, or can be a so-called conversion type silver halide grain as described in British Patent No. 635,841 and U.s. Pat. No. 3,622,318. Also, either grains of the type which form a latent image mainly on the surface thereof and grains of an internal latent image type which form a latent image within the grains can be used. These photographic emulsions are described in C. E. K. Mees & T. H. James, *The Theory of the Photographic Process*, 3rd Ed., Macmillan Co., New York, (1966), P. Glafkides, *Photographic Chemistry*, Fountain Press, (1957), etc., and can be prepared according to various processes commonly employed, such as an ammoniacal process, a neutral process, an acidic process, etc.

The mean grain size of the silver halide to be used (measured by, e.g., a projected area method, a numerical average method, etc.) is not particularly limited, but a mean grain size of from about 0.04 $\mu$m to about 2 $\mu$m is preferred. The grain size distribution (grain size being used in the above-described sense) can be either narrow or broad.

The silver halide emulsion can be an emulsion which is physically ripened or physically unripened. Usually, the soluble salts are removed from the emulsion after the formation of precipitates or after physical ripening. Removal of the soluble salts can be by a noodle-washing process or a flocculation process using an inorganic salt containing multivalent anion (e.g., ammonium sulfate, etc.), an anionic surface active agent, polystyrenesulfonic acid, other anionic polymers, an aliphatic or aromatic acylated gelatin or like gelatin derivatives.

The silver halide emulsion can be a chemically unsensitized emulsion (the so-called non-ripened emulsion), but a chemically sensitized emulsion can also be used. Suitable chemical sensitization processes which can be used are described in Mees and James, supra, Glafkides, supra, or H. Fieser, *Die Gruendlagen der Photographische Prozesse mit silberhalogeniden*, Akademische Verlagsgesellschaft (1968), and other various known processes can be used. That is, chemical sensitization techniques which can be used include sulfur sensitization using a sulfur-containing compound capable of reacting with silver ion, such as thiosulfate or the compounds described in U.S. Pat. Nos. 1,574,944, 2,278,947, 2,410,689, 3,189,458, 3,501,313, French Patent No. 2,059,245, etc., or an active gelatin; reduction sensitization using a reducing substance such as stannous salts described in U.S. Pat. No. 2,487,850, amines described in U.S. Pat. Nos. 2,518,698, 2,521,925, 2,521,926, 2,419,973, 2,419,975, iminoaminomethanesulfinic acid described in U.s. Pat. No. 2,983,610, silane compounds described in U.S. Pat. No. 2,694,637, or according to the process described in H. W. Wood, *Journal of Photographic Science*, Vol. 1, p. 163 et seq., (1953); gold sensitization using a gold complex salt described in U.S. Pat. No.

2,399,083, gold-thiosulfuric acid complex salt, etc.; sensitization using salts of noble metals such as platinum, palladium, iridium, rhodium, ruthenium, etc., individually or in combination as described in U.S. Pat. Nos. 2,448,060, 2,540,086, 2,566,245, and 2,566,263. Also, selenium sensitization described in U.S. Pat. No. 3,297,446 can be used in place of or in combination with the sulfur sensitization.

The photographic emulsion of the present invention can contain various compounds in order to prevent fogging during the production, during storage of the light-sensitive material or upon development-processing, or to stabilize the photographic properties. That is, azoles such as benzotriazole, benzothiazolium salt described in U.S. Pat. No. 2,131,038, aminobenzimidazole described in U.S. Pat. No. 2,324,123, etc.; nitroazoles such as nitroindazole, nitrobenzotriazole, nitrobenzimidazole described in British Patent No. 403,789, nitroaminobenzimidazole described in U.S. Pat. No. 2,324,123, etc.; halogen-substituted azoles such as 5-chlorobenzimidazole, 5-bromoimidazole, 6-chlorobenzimidazole, etc.; mercaptoazoles such as mercaptothiazole derivatives described in U.S. Pat. No. 2,824,001, mercaptobenzothiazole, derivatives thereof described in U.S. Pat. No. 2,697,099, mercaptoimidazole derivatives described in U.S. Pat. No. 3,252,799, mercaptobenzimidazole, mercaptooxadiazole described in U.S. Pat. No. 2,843,491, mercaptothiadiazole described in U.S. Pat. No. 1,758,576, phenylmercaptotetrazole described in U.S. Pat. No. 2,403,927; mercaptopyrimidine described in U.S. Pat. No. 2,304,962; mercaptotriazine described in U.S. Pat. No. 2,476,536; mercaptotetrazaindene described in U.S. Pat No. 3,226,231; thiosalicylic acid described in U.S. Pat. No. 2,377,375, thiobenzoic acid described in U.S. Pat. No. 3,226,231, sugar mercaptals described in Japanese Patent Publication No. 8743/72, and other various mercapto compounds; oxazolinethione described in U.S. Pat. No. 3,251,691, triazolothiadiazole described in Japanese Patent Publication No. 17932/68, and the like can be added to the emulsion. Also, azaindene compounds such as tetrazaindenes; compounds described in, e.g., U.S. Pat. Nos. 2,444,605, 2,444,606, 2,450,397, Japanese Patent Publication Nos. 10166/64, 10516/67, etc.; pentazaindenes; compounds described in, e.g., U.S. Pat. No. 2,713,541, Japanese Patent Publication No. 13495/68; urazols described in U.S. Pat. No. 2,708,161; and like nitrogen-containing hetero ring compounds having anti-fogging action can be incorporated into the emulsion. In addition, benzenesulfinic acid described in U.S. Pat. No. 2,394,198, benzenethiosulfonic acid and benzenesulfinic acid amide described in Japanese Patent Publication No. 4136/68, can be added to the emulsion. Further, various chelating agents to prevent fogging due to metal ions, such as those described in British Patent 623,488, Japanese Patent Publication Nos. 4941/68 and 13496/68 can be employed in the emulsion.

For the purpose of increasing the sensitivity and enhancing the contrast or accelerating development, the photographic emulsion of the present invention can contain polyalkylene oxide derivatives described in U.S. Pat. No. 2,441,389, polyalkylene oxide ethers, esters and amides described in U.S. Pat. No. 2,708,161, polyalkylene oxide derivatives described in British Patent No. 1,145,186, Japanese Patent Publication Nos. 10989/70, 15188/70, 43435/71, 8106/72 and 8742/72, thioether compounds described in U.S. Pat. Nos. 3,046,132 to 3,046,135, Japanese Patent Publication Nos. 9019/70 and 11119/72, thiomorpholines described in Japanese Patent Publication No. 28325/72, quaternary ammonium compounds described in U.S. Pat. No. 3,772,021, pyrrolidine compounds described in Japanese Patent Publication No. 27037/70, urethane or urea derivatives described in Japanese Patent Publication No. 23465/65, imidazole derivatives described in Japanese Patent Publication No. 45541/72, polymers described in Japanese Patent Publication No. 26471/70, 3-pyrazolidones described in Japanese Patent Publication No. 27670/70, and the like.

Inorganic or organic mercury compounds can be added to the photographic emulsion of the present invention in order to sensitize or prevent fogging. For example, mercury complex compounds described in U.S. Pat. No. 2,728,664, benzothiazole mercury salts described in U.S. Pat. No. 2,728,667, mercury salt adducts described in U.S. Pat. Nos. 2,728,663, and 2,732,302, organic mercury compounds described in U.S. Pat. Nos. 2,728,665 and 3,420,668, and the like can be used.

Additives having various functions for enhancing the quality of the photographic light-sensitive materials, such as a hardener, a coating aid, a plasticizer, an emulsion polymerization latex, an antistatic agent, an ultraviolet light-absorbing agent, an anti-oxidant, etc., can be incorporated into the photographic emulsion of the present invention.

The photographic emulsion of the present invention can be hardened using a commonly used hardener. Examples of hardener, which can be used, alone or in combination, include aldehydes such as glyoxal described in U.S. Pat. No. 1,870,354, glutaraldehyde described in British Patent No. 825,544, etc.; N-methylol compounds such as N,N'-dimethylol urea, dimethylolhydantoin described in British Pat. No. 676,628, etc.; dioxane derivatives such as dihydroxydioxane described in U.S. Pat. No. 3,380,829, the derivative thereof described in Japanese Patent Publication No. 38713/71; epoxy group-containing compounds such as those described in U.S. Pat. Nos. 3,047,394, 3,091,537, Japanese Patent Publication No. 7133/59; reactive halogen-containing compounds such as 2,4-dichloro-6-hydroxy-1,3,5-triazine described in U.S. Pat. No. 3,325,287, mucohalogenic acid such as mucochloric acid and mucobromic acid described in U.S. Pat. No. 2,080,019, the derivatives thereof described in Japanese Patent Publication No. 1872/71; bis(methanesulfonic acid ester) described in U.S. Pat. No. 2,726,162; sulfonyl compounds such as bis(benzenesulfonyl chloride) described in U.S. Pat. No. 2,725,295; aziridine compounds such as those described in Japanese Patent Publication Nos. 4212/58 and 8790/62; divinylsulfones such as those described in U.S. Pat. No. 2,579,871, etc.; reactive olefin bond-containing compounds such as divinyl ketones of the compounds described in German Patent No. 872,153, acryloyl group-containing compounds described in U.S. Pat. Nos. 3,255,000, 3,635,718, British Patent No. 994,869, West German Patent No. 1,090,427, etc., alkylenebismaleimides described in U.S. Pat. Nos. 2,992,109, etc.; isocyanates described in U.S. Pat. No. 3,103,437, etc.; carbodiimides described in U.S. Pat. No. 3,100,704, etc.; isoxazole derivatives such as those described in U.S. Pat. Nos. 3,321,313 and 3,543,292; chlorocarbamoyl derivatives described in Japanese Patent Publication No. 6899/66, etc.; high molecular weight hardeners such as aldehyde starch described in U.S. Pat. No. 3,057,723, compounds described in Japanese Patent Publication No. 12550/67, etc.; inorganic hardeners such as chromium alum, chromium acetate, zirconium sulfate, and the like.

Various known surface active agents can be added to the photographic emulsion of the present invention as a coating aid or for improving the antistatic properties, lubrication, and the like. For example, nonionic surface active agents such as saponin, polyethylene glycol, polyethylene glycolpolypropylene glycol condensate described in U.S. Pat. No. 3,294,540, alkylene glycol ethers described in U.S. Pat. Nos. 2,240,472 and 2,831,766, polyalkylene glycol esters, polyalkylene glycol amides, etc.; anionic surface active agents such as alkylcarboxylates, alkylsulfonates, alkylbenzenesulfonates, alkylnaphthalenesulfonates, alkylsulfates, N-acylated N-alkyltaurines described in U.S. Pat. No. 2,739,891, maleopimelates described in U.S. Pat. Nos. 2,359,980, 2,409,930 and 2,447,750, compounds described In U.S. Pat. Nos. 2,823,123 and 3,415,649, etc.; and amphoteric surface active agents such as the compounds described in British Patent No. 1,159,825, Japanese Patent Publication No. 378/65, Japanese Patent Application (OPI) No. 43924/73, U.S. Pat. No. 3,726,683, etc., can be employed.

A plasticizer such as glycerin and diols described in U.S. Pat. No. 2,960,404, trihydric aliphatic alcohols described in U.S. Pat No. 3,520,694 can be incorporated in the photographic emulsion of the present invention.

The photographic emulsion of the present invention can contain, for the purpose of improving the dimensional stability, a water-insoluble or slightly water-soluble synthetic polymer dispersion. For example, polymers containing as a monomer component alkyl acrylates, alkyl methacrylates, alkoxy acrylates, alkoxy methacrylates, glycidyl acrylate, glycidyl methacrylate, acrylamide, methacrylamide, vinyl acetate, acrylonitrile, olefins, styrene, etc., individually or in combination, or as a combination thereof with acrylic acid, $\alpha,\beta$-unsaturated dicarboxylic acids, sulfoalkyl acrylates, styrenesulfonic acid, etc., can be used. Specific examples include the polymers described in U.S. Pat. Nos. 2,376,005, 3,607,290, 3,645,740, British Patent Nos. 1,186,699, 1,307,373, U.S. Pat. Nos. 3,062,674, 2,739,137, 3,411,911, 3,488,708, 3,635,715, 2,853,457.

Irradiation-preventing agents which can be incorporated according to the end-use thereof include, e.g., those described in Japanese Patent Publication Nos. 20389/66, 3504/68, 13168/68, U.S. Pat. Nos. 2,697,037, 3,423,207, 2,865,752, British Patent Nos. 1,030,392, 1,100,546, etc.

The photographic emulsion of the present invention can contain commonly used non-diffusible, color image-forming couplers. The color image-forming couplers mean those compounds capable of reacting with an oxidation product of an aromatic primary amine developing agent upon photographic development (hereinafter abbreviated as "coupler"). The couplers can be a 4-equivalent type coupler or a 2-equivalent type coupler, and can be a colored coupler for color correction or a development inhibitor-releasing coupler. Open-chain ketomethylene type compounds such as acylaminoacetamides series are used as yellow-forming couplers. Compounds of the pyrazolone series or the cyanoacetyl series are used as magenta-forming couplers and naphtholic or phenolic couplers are used as cyan-forming couplers. The couplers can be incorporated into the photographic emulsion layers using a process commonly employed for multicolor light-sensitive materials.

Examples of 4-equivalent type or 2-equivalent type diketomethylene yellow couplers which can be used include the compounds described in U.S. Pat. Nos. 3,277,157, 3,415,652, 3,447,928, 3,311,476, 3,408,194, etc., the compounds described in U.S. Pat. Nos. 2,875,057, 3,265,506, 3,409,439, 3,551,155, 3,551,156, West German Patent Application (OLS) Nos. 1,956,281, 2,162,899, etc., and the compounds described in Japanese Patent Application (OPI) Nos. 26133/72, 66836/73, etc.; of 4-equivalent type or 2-equivalent type pyrazolone magenta couplers or indazolone magenta couplers include the compounds as described in U.S. Pat. Nos. 2,600,788, 2,983,608, 3,006,759, 3,062,653, 3,214,437, 3,253,924, 3,419,391, 3,419,808, 3,476,560, 3,582,322, Japanese Patent Publication No. 20636/70, Japanese Patent Application (OPI) No. 26133/72, etc.; of $\alpha$-naphtholic cyan couplers or phenolic cyan couplers include the compounds described in U.S. Pat. Nos. 2,474,293, 2,698,794, 3,034,892, 3,214,437, 3,253,924, 3,311,476, 3,458,315, 3,591,383 Japanese Patent Publication Nos. 11304/67, 32461/69, etc. In addition, the DIR couplers or the DIR compounds described in U.S. Pat. Nos. 3,227,554, 3,148,062, 3,297,445, 3,253,924, 3,311,476, 3,379,529, 3,516,831, 3,617,291, 3,705,801, 3,632,345, West German Patent Application (OLS) No. 2,163,811, etc., can be used.

The present invention can be applied to a multi-layered multi-color photographic material comprising a support having thereon at least two emulsion layers having different spectral sensitivities. Multi-layer natural color photographic materials usually comprise a support having thereon at least one red-sensitive silver halide emulsion layer, one green-sensitive silver halide emulsion layer and one blue-sensitive silver halide emulsion layer. The sequence of these layers can be optionally selected depending on the end-use requirements. Usually, a cyan-forming coupler is associated with a red-sensitive silver halide emulsion layer, a magenta-forming coupler with a green-sensitive silver halide emulsion layer and a yellow-forming coupler with a blue-sensitive silver halide emulsion layer, but, in some cases, other combinations can be employed.

The photographic emulsion of the present invention can contain a developing agent such as aromatic diols (e.g., hydroquinone, etc.), aminophenols, phenylenediamines, 3-pyrazolidones, ascorbic acid or a derivative thereof, individually or in combination. The combination of the hydroquinone described in Japanese Patent Publication No. 43814/73 and an N-hydroxyalkyl-substituted p-aminophenol derivative is particularly advantageous. Water-insoluble developing agents can be added as a dispersion, e.g., as described in U.S. Pat. No. 2,592,368 and French Patent No. 1,505,778.

The photographic emulsion of the present invention can be coated separately or together with other hydrophilic layers, on a support using various known coating processes. Suitable coating processes include dip coating, air-knife coating, roller coating, curtain coating and extrusion coating. The process described in U.S. Pat. No. 2,681,294 is an advantageous process. Also, two or more layers can be coated at the same time using the process as described in U.S. Pat. Nos. 2,761,791, 3,526,528, etc.

Suitable supports include any of those which are transparent or opaque and are commonly used for photographic emulsions, such as a glass plate; a film comprising a synthetic high polymer such as a polyalkyl acrylate, a polyalkyl methacrylate, polystyrene, polyvinyl chloride, partially formalated polyvinyl alcohol, polycarbonate, a polyester (e.g., polyethylene terephthalate, etc.), a polyamide, etc.; a film comprising a cellulose derivative such as cellulose acetate, cellulose nitrate, cellulose acetate butyrate, etc.; paper, baryta-coated paper, $\alpha$-olefin polymer-coated paper; synthetic papers comprising polystyrene or the like; ceramics, metal, and the like.

For the photographic processing of the photographic emulsion of the present invention, any known processing procedure employing known processing solutions can be used. The processing temperature can be lower than about 18° C, about 18° C to about 50° C, or higher than about 50° C.

A silver image-forming development (black-and-white photographic processing) or a color photographic processing comprising a development-processing for forming dye images can be applied to the light-sensitive material of the present invention.

Suitable developing agents which can be used include 4-aminophenols represented by N-methyl-4-aminophenol hemisulfate (popularly called "Metol"), N-benzyl-4-aminophenol hydrochloride, N,N-diethyl-4-aminophenol hydrochloride, 4-aminophenol sulfate, etc.; 3-pyrazolidones such as 1-phenyl-3-pyrazolidone, 4,4-dimethyl-1-phenyl-3-pyrazolidone, 4-methyl-1-phenyl-3-pyrazolidone. etc.; polyhydroxybenzenes such as hydroquinone, 2-methylhydroquinone, 2-phenylhydroquinone, 2-chlorohydroquinone, pyrogallol, catechol, etc.; p-phenylenediamines such as p-phenylenediamine sulfate, etc.; ascorbic acid; N-(p-hydroxyphenyl)glycine; and the compounds described in C. E. K. Mees and T. H. James, *The Theory of the Photographic Process*, 3rd Ed., Chapter 13, Macmillan Co., New York (1966), and L. F. A. Mason, *Photographic Processing Chemistry*, pp. 16 – 30, Focal Press, London (1966), individually or in suitable combination.

Dye images can be obtained by subjecting the silver halide photographic emulsion of the invention to color development processing.

Color development processing fundamentally involves a color development step, a bleaching step and a fixing step. In this case, two or more steps can be combined by using a processing solution having functions permitting the steps to be conducted as one step (e.g., a combined bleach-fixing solution, etc.). The processing temperature is selected within preferred ranges depending on the light-sensitive materials employed and processing solution compositions employed. In some cases, temperatures lower than about 18° C can be employed. However, in many cases, temperatures of about 18° C or above are used. Temperatures particularly employed range from about 20° to 60° C, recently from about 30° to 60° C.

The color developer is an alkaline aqueous solution of a pH of about 8 or above, preferably 9 to 12, containing a compound, i.e., a developing agent, whose oxidation product can react with a coloring agent, called a coupler, to form a colored product. The above-described developing agent is a compound having a primary amino group on an aromatic ring and having the ability of developing exposed silver halide, or is a precursor thereof capable of forming such a compound. For example, typical examples of developing agents include 4-amino-N,N-diethylaniline, 3-methyl-4-amino-N,N-diethylaniline, 4-amino-N-ethyl-N-$\beta$-hydroxyethylaniline, 3-methyl-4-amino-N-ethyl-N-$\beta$-hydroxyethylaniline, 4-amino-3-methyl-N-ethyl-N-$\beta$-methanesulfonamidoethylaniline, 4-amino-N,N-dimethylaniline, 4-amino-3-methoxy-N,N-diethylaniline, 4-amino-3-methyl-N-ethyl-N-$\beta$-methoxyethylaniline, 4-amino-3-methoxy-N-ethyl-N-$\beta$-methoxyethylaniline, 4-amino-3-$\beta$-methanesulfonamidoethyl-N,N-diethylaniline and the salts thereof (e.g., the sulfate, hydrochloride, sulfite, p-toluenesulfonate, etc.). In addition, those developing agents described in U.S. Pat. Nos. 2,193,015, 2,592,364, Japanese Patent Application (OPI) No. 64933/73, L. F. A. Mason, *Photographic Processing Chemistry*, pp. 226 – 229, Focal Press, London (1966), and the like can also be used.

Also, the above-described compounds can be used in combination with 3-pyrazolidones. If necessary, various additives can be added to the color developing solution. For example, a development accelerator (e.g., various pyridinium compounds described in U.S. Pat. Nos. 2,648,604, 3,671,247, etc., cationic compounds, potassium nitrate, sodium nitrate, polyethylene glycol condensates described in U.S. Pat. Nos. 2,533,990, 2,577,127, 2,950,970, etc., and the derivative thereof, nonionic compounds such as polythioethers represented by the compounds described in British Pat. Nos. 1,020,033 and 1,020,032, polymers having a sulfite ester group represented by the compounds described in U.S. Pat. No. 3,068,097, organic amines such as pyridine, ethanolamine, etc., benzyl alcohol, hydrazines, and the like), an anti-fogging agent (e.g., potassium bromide, potassium iodide, nitrobenzimidazoles described in U.S. Pat. Nos. 2,496,940 and 2,656,271, mercaptobenzimidazole, 5-methylbenzotriazole, 1-phenyl-5-mercaptotetrazole compounds described in U.S. Pat. Nos. 3,113,864, 3,342,596, 3,295,976, 3,615,522, 3,597,199, etc., thiosulfonyl compounds described in British patent No. 972,211, phenazine-N-oxides described in Japanese Patent Publication No. 41675/71, anti-fogging agents described in *Kagaku Shashin Binran* (*Handbook of Photographic Science*), II, pp. 29 – 47, etc.), stain- or sludge-preventing agents described in U.S. Pat. Nos. 3,161,513, 3,161,514, British Patent Nos. 1,030,442, 1,144,481, 1,251,558, an inter-image effect-accelerating agent described in U.S. Pat. No. 3,536,487, etc., can be incorporated in the photographic developer solution.

The light-sensitive material comprising the photographic emulsion of the present invention is fixed, after development-processing, in a conventional manner. In some cases, the bleaching may be conducted simultaneously with or separately from the fixing. Where the bleaching and fixing are conducted at the same time, a bleach-fixing bath containing both a bleaching agent and a fixing agent is used. Many compounds can be used as the bleaching agent. Of these, ferricyanic acid salts, dichromates, water-soluble cobalt (III) salts, water-soluble copper (II) salts, water-soluble quinones, nitrosophenols, compounds of multi-valent metals such as iron (III), cobalt (III), copper (II), etc., and an organic acid, in particular, complex salts between these multi-valent metal cations and organic acids (e.g., metal complex salts of ethylenediaminetetraacetic acid, nitrilotriacetic acid, iminodiacetic acid, N-hydroxyethylethylenediaminetriacetic acid or like aminopolycarboxylic acids, malonic acid, tartaric acid, malic acid, diglycolic acid, dithioglycolic acid, 2,6-dipicolinic acid-copper complex salt, etc.), peroxides (e.g., alkylperacids, persulfates, permanganates, hydrogen peroxide, etc.), hypochlorite, chlorine, bromine, and the like are used. Bleaching, fixing or bleach-fixing is described in U.S. Pat. No. 3,582,322, etc.

A bleaching accelerator described in U.S. Pat. Nos. 3,042,520, 3,241,966, Japanese Patent Publication Nos. 8506/70, 8836/70, etc., can be added to this processing solution.

The present invention can be applied to various silver halide emulsions for color or black-and-white light-sensitive materials. Such emulsions include, e.g., emulsions for color positives, emulsions for color papers, emulsions for color negatives, emulsions for color reversal photographic materials (which may contain couplers), photographic light-sensitive materials for the graphic arts (e.g, lith films, etc.), emulsions for light-sensitive materials for recording cathode ray tube displays, emulsions for X-ray recording, light-sensitive materials (in particular, light-sensitive materials for direct or indirect photographing using an intensifying screen), emulsions for use in a colloid transfer process (described in, e.g., U.S. Pat. No. 2,716,059, etc.), emulsions for use in a silver salt diffusion transfer process (described in, e.g., U.S. Pat. Nos. 2,352,014, 2,543,181, 3,020,155, 2,861,185, etc.), emulsions for use in a color diffusion transfer process (described in, e.g., U.S. Pat. Nos. 3,087,817, 3,185,567, 2,983,606, 3,253,915, 3,227,550, 3,227,551, 3,227,552, 3,415,644, 3,415,645, 3,415,646, etc.), emulsions for use in a dye transfer process (described in, e.g., U.S. Pat. No. 2,882,156, etc.), emulsions for use in a silver dye-bleaching process (described in Friedman, *History of Color Photography*, particularly Chapter 24, American Photographic Publishers Co. (1944), *British Journal of Photography*, Vol. 111, pp. 308 – 309 (Apr. 7, 1964), etc.), emulsions for materials for recording print-out images (described in, e.g., U.S. Pat. No. 2,369,449, Belgian Patent No. 704,255, etc.), emulsions for print-out light-sensitive materials of the light-developable type (described in, e.g., U.S. Pat. Nos. 3,033,682, 3,287,137, etc.), emulsions for heat developable light-sensitive materials (described in, e.g., U.S. Pat. Nos. 3,152,904, 3,312,550, 3,148,122, British Patent No. 1,110,046, etc.), emulsions for physically developable light-sensitive materials (described in, e.g., British Pat. Nos. 920,277, 1,131,238, etc.), and the like.

One feature of the present invention is that a supersensitizing effect is found by the use of the sensitizing dye represented by General Formula (I) and the sensitizing dye represented by General Formula (II) in combination. Generally, which combination of sensitizing dyes will give rise to super-sensitization can not be anticipated from their chemical structures only, since supersensitization is markedly affected even by slight differences in chemical structures. The dye represented by General Formula (I) and the dye represented by General Formula (II) are monomethine cyanine dye. The feature of the chemical structure represented by General Formula (I) is that at least one basic nucleus is a quinoline or pyridine nucleus, while the feature of the chemical structure represented by General Formula (II) is that at least one basic nucleus is a naphthothiazole or naphthoselenazole nucleus. It is surprising that a supersensitizing effect is found between monomethine cyanine dyes having different chemical structures.

Another feature of the invention is that a high blue sensitivity is obtained with a combination of the above-described dyes having a supersensitizing effect, while, at the same time, the spectral sensitivity distribution is sharply cut at the long wavelength side. When the photographic emulsion of the invention is used in a blue-sensitive layer of a color photographic element, therefore, color separation from a green-sensitive layer is very good and excellent color reproduction is possible. On the other hand, in the case of blue range sensitization of a black-and-white photograhic element, it is possible to handle under a safe light that is relatively bright to the naked eye.

A further feature of the invention is that a high blue sensitivity is obtained and, simultaneously, a silver halide photographic emulsion substantially free from dye contamination due to the dye is obtained. This is surprising that, in spite of a considerable dye contamination remaining in the case of using the dye represented by General Formula (I) and the dye represented by General Formula (II) individually, both having alkyl groups with a sulfo group or a carboxy group as an N-substituent of the basic nucleus, the use of both dyes in combination results in substantially no dye contamination. Furthermore, the supersensitizing combination according to the present invention can provide a high blue sensitivity even in the presence of an incorporated coupler for color sensitive materials and/or an anionic compound such as an irradiation prevention dye having a sulfo group in the chemical structure or gelatin flocculant having a sulfo group, which are generally considered to hinder spectral sensitization.

A still further feature of the invention is that the combination for supersensitization according to the present invention does not result in a substantial reduction in the spectral sensitivity during dissolving or allowinng the emulsion to stand or during storage of the light-sensitive material before processing, even when a color image forming coupler is present in the photographic emulsion.

The following non-limiting examples are given in order to illustrate the invention in greater detail. Unless otherwise indicated, all parts, percents, ratios and the like are by weight.

EXAMPLE 1

Silver halide photograhic emulsions were prepared by incorporating sensitizing dyes individually or in combination in a silver iodobromide emulsion (AgI:AgBr = 7 mol %:93 mol %; gelatin (g)/AgNO$_3$ (g) = 1.3 ; 0.53 mol silver salt/kg emulsion). The mean particle size of the silver halide grains was 0.70 μm.

These emulsions were respectively coated on a cellulose triacetate film support, dried, and then subjected to an optical wedge exposure for one-fiftieth second using a daylight light source of 64 lux corresponding to 5400° K through an SC-46 filter manufactured by the Fuji Photo Film Co., Ltd. (a yellow filter permitting passage of longer wavelengths than 460 nm and having a spectral transmission as shown in the FIGURE), developed with a developer having the following composition at 20° C for 6 minutes, stopped, fixed, washed with water and dried.

| Developer Composition | |
|---|---|
| Metol | 2 g |
| Sodium Sulfite (anhydrous) | 40 g |
| Hydroquinone | 4 g |
| Sodium Carbonate (monohydrate) | 28 g |
| Potassium Bromide | 1 g |
| Water to make | 1 l |

Then the density was measured using a P-type densitometer manufactured by the Fuji Photo Film Co., Ltd. to determine the sensitivity and fog. To determine the sensitivity, the reciprocal of the exposure quantity required was used while the standard optical density was fog + 0.10. The results obtained are shown in Table 1 as a relative value to the standard value of Run No. 2 or Run No. 12.

TABLE 1

| Run No. | Sensitizing Dye and Amount Added ($\times 10^{-5}$ mol/AgBr 1 mol) | | Specific Sensitivity | Fog |
|---|---|---|---|---|
| 1 | I - 5 (1.7) | | 91.2 | 0.10 |
| 2 | " (3.4) | | 100 | 0.11 |
| 3 | " (6.8) | | 93.3 | 0.11 |
| 4 | II - 10 (1.7) | | 38.9 | 0.09 |
| 5 | " (3.4) | | 41.7 | 0.09 |
| 6 | " (6.8) | | 41.7 | 0.09 |
| 7 | I - 5 (1.7) | II - 10 (5.1) | 132 | 0.10 |
| 8 | " (3.4) | " (3.4) | 138 | 0.11 |
| 9 | " (5.1) | " (1.7) | 138 | 0.11 |
| 11 | I - 2 (1.7) | | 87.1 | 0.10 |
| 12 | " (3.4) | | 100 | 0.10 |
| 13 | " (6.8) | | 97.8 | 0.11 |
| 14 | II - 4 (1.7) | | 32.4 | 0.09 |
| 15 | " (3.4) | | 33.1 | 0.09 |
| 16 | " (6.8) | | 32.4 | 0.09 |
| 17 | I - 2 (1.7) | II - 4 (5.1) | 132 | 0.10 |
| 18 | " (3.4) | " (3.4) | 138 | 0.10 |
| 19 | " (5.1) | " (1.7) | 129 | 0.10 |

It is apparent from the results of Table 1 that an excellent supersensitizing effect is obtained according to the invention.

EXAMPLE 2

The same combinations of dyes as those of Example 1, Run Nos. 7 to 9 and 17 to 19 were added in the same amounts of a silver chlorobromide emulsion containing as a yellow image forming coupler α-(4-palmitamidophenoxy)-α-pivaloyl-4-sulfamoylacetanilide (as described in U.S. Pat. No. 3,408,194) (Br:90 mol %, Cl: 10 mol %, gelatin: 170 g per mol of silver, silver: 0.43 mol per kg of emulsion), coated onto photographic papers coated with polyethylene and dried. The six samples obtained in this manner were subjected to the following color processings without exposure to examine the degree of residual coloring of the dyes used for supersensitization. When the samples processed were viewed, all of the samples were found to have scarcely any residual coloring and could be practically used.

| Processing | temperature | Time |
|---|---|---|
| Color Development | 30° C | 6 min |
| Stopping | 30° C | 2 min |
| Water Washing | 30° C | 2 min |
| Bleaching and Fixing | 30° C | 1 min and 30 sec |
| Water Washing | 30° C | 2 min |
| Stabilizing Bath | 30° C | 2 min |
| Drying | 30° C | |

The processing solutions had the following compositions:

| Color Developer | |
|---|---|
| Benzyl Alcohol | 12 ml |
| Diethylene Glycol | 3.5 ml |
| Sodium Hydroxide | 2.0 g |
| Sodium Sulfite | 2.0 g |
| Potassium Bromide | 0.4 g |
| Sodium Chloride | 1.0 g |
| Borax | 4.0 g |
| Hydroxylamine Sulfate | 2.0 g |
| Disodium Ethylenediaminetetraacetate (dihydrate) | 2.0 g |
| 4-Amino-3-methyl-N-ethyl-N-(β-methanesulfonamidoethyl)aniline Sesquisulfate (monohydrate) | 5.0 g |
| Water to make | 1000 ml |
| Stopping Solution | |
| Sodium Thiosulfate | 10 g |
| Ammonium Thiosulfate (70% aq. soln.) | 30 ml |
| Sodium Acetate | 5 g |
| Acetic Acid | 30 ml |
| Potassium Alum | 15 g |
| Water to make | 1000 ml |
| Bleaching and Fixing Solution | |
| Ferric Sulfate | 20 g |
| Disodium Ethylenediaminetetraacetate (dihydrate) | 36 g |
| Sodium Carbonate (monohydrate) | 17 g |
| Sodium Sulfite | 5 g |
| Ammonium Thiosulfate (70% aq. soln.) | 100 ml |
| Boric Acid | 5 g |
| pH | 6.8 |
| Water to make | 1000 ml |
| Stabilizing Solution | |
| Acetic Acid | 5 g |
| Sodium Citrate | 5 g |
| Sodium Metaborate (tetrahydrate) | 3 g |
| Potassium Alum | 15 g |
| Water to make | 1000 ml |

While the invention has been described in detail and with reference to specific embodiments thereof, it will be apparent to one skilled in the art that various changes and modifications can be made therein without departing from the spirit and scope thereof.

What is claimed is:

1. A silver halide photographic emulsion containing, in supersensitizing amounts, at least one sensitizing dye represented by the following General Formula (I):

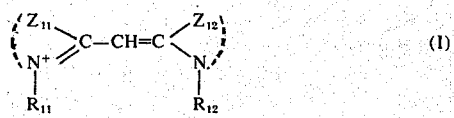

in which $Z_{11}$ represents an atomic group necessary for completing a pyridine or quinoline nucleus; $Z_{12}$ represents an atomic group necessary for completing an oxazole, benzoxazole, naphthoxazole, imidazole, benzimidazole or naphthimidazole nucleus; and $R_{11}$ and $R_{12}$ each represents an aliphatic group and at least one of $R_{11}$ and $R_{12}$ is an aliphatic group containing a carboxy group or a sulfo group; and at least one sensitizing dye represented by the following General Formula (II):

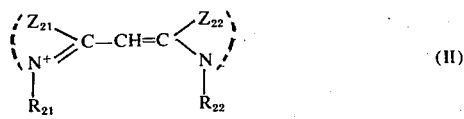

in which $Z_{21}$ represents an atomic group necessary for completing a thiazole, benzothiazole, naphthothiazole, selenazole, benzoselenazole or naphthoselenazole nucleus; $Z_{22}$ represents an atomic group necessary for completing an imidazole, benzimidazole or naphthimidazole nucleus; and $R_{21}$ and $R_{22}$ each represents an aliphatic group, and at least one of $R_{21}$ and $R_{22}$ is an aliphatic group containing a carboxy group or a sulfo group.

2. The silver halide photographic emulsion of claim 1, wherein the sensitizing dye represented by General Formula (I) is represented by the General Formula (III):

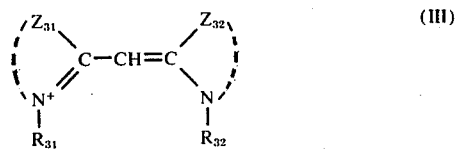

in which $Z_{31}$ represents an atomic group necessary for completing a pyridine or quinoline nucleus; $Z_{32}$ represents an atomic group necessary for completing an oxazole, benzoxazole, naphthoxazole, benzimidazole or naphthimidazole nucleus; $R_{31}$ represents an alkyl group which may be substituted with a hydroxyl group, a $-A_{31}-COOH$ group or a $-A_{31}-SO_3H$ group wherein $A_{31}$ represents an alkylene group which may be substituted with a hydroxyl group; and $R_{32}$ represents a $-A_{32}-COOH$ group or a $-A_{32}-SO_3H$ group wherein $A_{32}$ has the same meaning as $A_{31}$.

3. The silver halide photographic emulsion of claim 1, wherein the sensitizing dye represented by General Formula (II) is represented by General Formula (IV):

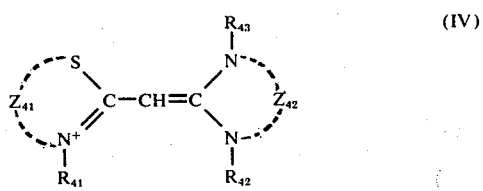

in which $Z_{41}$ represents an atomic group necessary for completing a naphthothiazole nucleus; $Z_{42}$ represents an atomic group necessary for completing a benzimidazole or naphthimidazole nucleus; $R_{41}$ represents an alkyl group which may be substituted with a hydroxyl group, a $-A_{41}-SO_3H$ group or a $-A_{41}-COOH$ group wherein $A_{41}$ represents an alkylene group which may be substituted with a hydroxyl group; $R_{42}$ represents a $-A_{42}-SO_3H$ group or a $-A_{42}-COOH$ group wherein $A_{42}$ has the same meaning as $A_{41}$; and $R_{43}$ represents an alkyl group, a hydroxyalkyl group, an acyloxyalkyl group or an alkoxyalkyl group.

4. The silver halide photographic emulsion of claim 1, wherein the sensitizing dye represented by General Formula (I) has the General Formula (III):

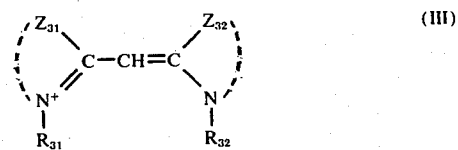

in which $Z_{31}$ represents an atomic group necessary for completing a pyridine or quinoline nucleus; $Z_{32}$ represents an atomic group necessary for completing an oxazole, benzoxazole, naphthoxazole, benzimidazole or naphthimidazole nucleus; $R_{31}$ represents an alkyl group which may be substituted with a hydroxyl group, a $-A_{31}-COOH$ group or a $-A_{31}-SO_3H$ group wherein $A_{31}$ represents an alkylene group which may be substituted with a hydroxyl group; and $R_{32}$ represents a $-A_{32}-COOH$ group or a $-A_{32}-SO_3H$ group wherein $A_{32}$ has the same meaning as $A_{31}$; and the sensitizing dye represented by General Formula (II) has the General Formula (IV):

$$\text{(IV)}$$

in which $Z_{41}$ represents an atomic group necessary for completing a naphthothiazole nucleus; $Z_{42}$ represents an atomic group necessary for completing a benzimidazole or naphthimidazole nucleus; $R_{41}$ represents an alkyl group which may be substituted with a hydroxyl group, a $-A_{41}-SO_3H$ group or a $-A_{41}-COOH$ group wherein $A_{41}$ represents an alkylene group which may be substituted with a hydroxyl group; $R_{42}$ represents a $-A_{42}-SO_3H$ group or a $-A_{42}-COOH$ group wherein $A_{42}$ has the same meaning as $A_{41}$; and $R_{43}$ represents an alkyl group, a hydroxyalkyl group, an acyloxyalkyl group or an alkoxyalkyl group.

5. The silver halide photographic emulsion of claim 1, wherein the sensitizing dye represented by General Formula (I) has the General Formula (V):

$$\text{(V)}$$

in which $R_{51}$ and $R_{52}$ each represents a $-A_{32}-COOH$ group or a —$A_{32}SO_3H$ group where $A_{32}$ is an alkylene group which may be substituted with a hydroxyl group; $Y_{51}$ represents a hydrogen atom, a halogen atom, an alkyl group or an alkoxy group; and $Y_{52}$ has the same meaning as $Y_{51}$; and the sensitizing dye represented by General Formula (II) has the General Formula (IV):

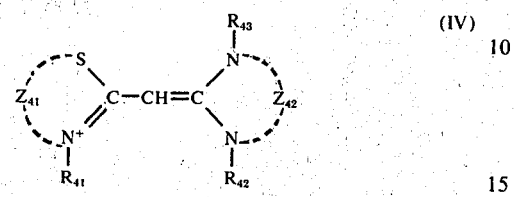

(IV)

in which $Z_{41}$ represents an atomic group necessary for completing a naphthothiazole nucleus; $Z_{42}$ represents an atomic group necessary for completing a benzimidazole or naphthimidazole nucleus; $R_{41}$ represents an alkyl group which may be substituted with a hydroxyl group, a —$A_{41}$—$SO_3H$ group or a —$A_{41}$—COOH group wherein $A_{41}$ represents an alkylene group which may be substituted with a hydroxyl group; $R_{42}$ represents a —$A_{42}$—$SO_3H$ group or a —$A_{42}$—COOH group wherein $A_{42}$ has the same meaning as $A_{41}$; and $R_{43}$ represents an alkyl group, a hydroxyalkyl group, an acyloxyalkyl group or an alkoxyalkyl group.

6. The silver halide photographic emulsion of claim 1, wherein the sensitizing dye represented by General Formula (I) has the General Formula (III):

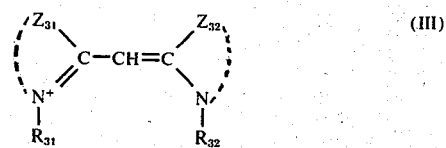

(III)

in which $Z_{31}$ represents an atomic group necessary for completing a pyridine or quinoline nucleus; $Z_{32}$ represents an atomic group necessary for completing an oxazole, benzoxazole, naphthoxazole, benzimidazole or naphthimidazole nucleus; $R_{31}$ represents an alkyl group which may be substituted with a hydroxyl group, a —$A_{31}$—COOH group or a —$A_{31}$—$SO_3H$ group wherein $A_{31}$ represents an alkylene group which may be substituted with a hydroxyl group; and $R_{32}$ represents a —$A_{32}$—COOH group or a —$A_{32}$—$SO_3H$ group wherein $A_{32}$ has the same meaning as $A_{31}$; and the sensitizing dye represented by General Formula (II) has the General Formula (VI):

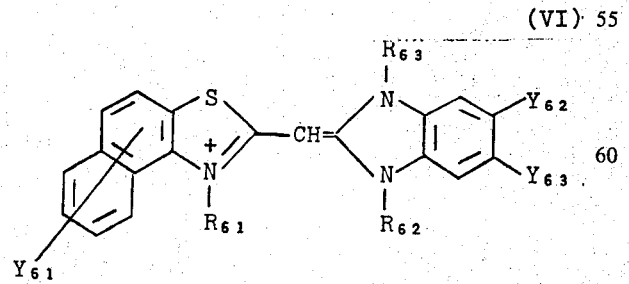

(VI)

and

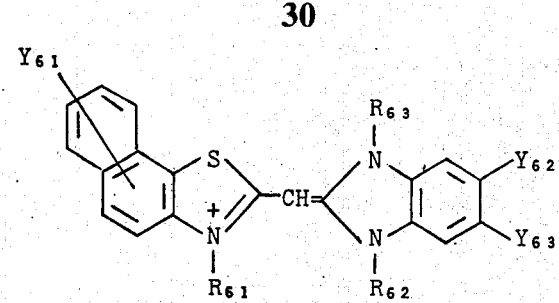

in which $R_{61}$ represents an alkyl group which may be substituted with a hydroxyl group, a —$A_{41}$—$SO_3H$ group or a —$A_{41}$—COOH group wherein $A_{41}$ represents an alkylene group which may be substituted with a hydroxy group; $R_{62}$ represents a —$A_{42}$—$SO_3H$ group or a —$A_{42}$—COOH group wherein $A_{42}$ has the same meaning as $A_{41}$; $R_{63}$ represents an alkyl group, a hydroxyalkyl group, an acyloxyalkyl group or an alkoxyalkyl group; $Y_{61}$ represents a hydrogen atom, alkyl group or a halogen atom; $Y_{62}$ represents a hydrogen atom or a halogen atom and $Y_{63}$ represents a hydrogen atom, a halogen atom, an alkylsulfonyl group or an alkoxycarbonyl group.

7. The silver halide photographic emulsion of claim 1, wherein the sensitizing dye represented by General Formula (I) has the General Formula (V):

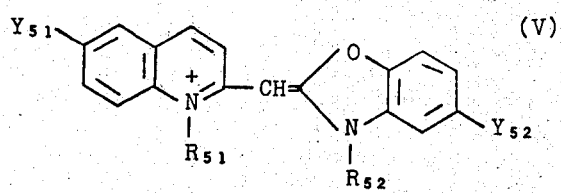

(V)

in which $R_{51}$ and $R_{52}$ represents a —$A_{32}$—COOH or —$A_{32}SO_3H$ group where $A_{32}$ is an alkylene group which may be substituted with a hydroxyl group; $Y_{51}$ represents a hydrogen atom, a halogen atom, an alkyl group or an alkoxy group; and $Y_{52}$ has the same meaning as $Y_{51}$; and the sensitizing dye represented by the General Formula (II) has the General Formula (IV):

(VI)

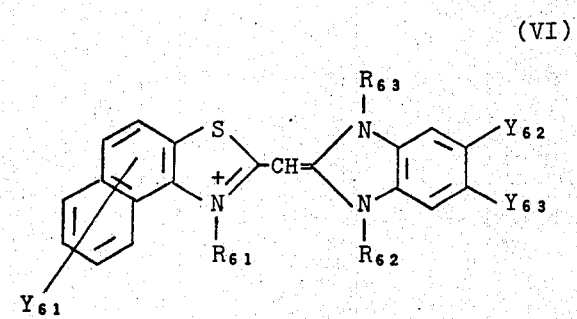

and

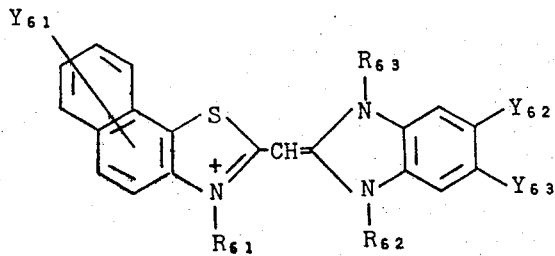

in which $R_{61}$ represents an alkyl group which may be substituted with a hydroxyl group, a $-A_{41}-SO_3H$ group or a $-A_{41}-COOH$ group wherein $A_{41}$ represents an alkylene group which may be substituted with a hydroxy group; $R_{62}$ represents a $-A_{42}-SO_3H$ group or a $-A_{42}-COOH$ group wherein $A_{42}$ has the same meaning as $A_{41}$; $R_{63}$ represents an alkyl group, a hydroxyalkyl group, an acyloxyalkyl group or an alkoxyalkyl group; $Y_{61}$ represents a hydrogen atom, alkyl group or a halogen atom; $Y_{62}$ represents a hydrogen atom or a halogen atom and $Y_{63}$ represents a hydrogen atom, a halogen atom, an alkylsulfonyl group or an alkoxycarbonyl group.

8. The silver halide photographic emulsion of claim 5, in which $R_{51}$ and $R_{52}$ each represents an unsubstituted sulfoalkyl group or an unsubstituted carboxyalkyl group; $Y_{51}$ represents a hydrogen atom; and $Y_{52}$ represents a halogen atom or an alkyl group.

9. The silver halide photographic emulsion of claim 6, in which $R_{61}$ and $R_{62}$ each represents, an alkyl group, an unsubstituted carboxyalkyl group or an unsubstituted sulfoalkyl group; $R_{63}$ represents an alkyl group; $Y_{61}$ represents a hydrogen atom; $Y_{62}$ and $Y_{63}$ each represents a halogen atom.

10. The silver halide photographic emulsion of claim 7, in which $R_{51}$, $R_{52}$, $R_{61}$ and $R_{62}$ each represents an unsubstituted carboxyalkyl group, or an unsubstituted sulfoalkyl group; $Y_{51}$ represents a hydrogen atom or an alkyl group; $R_{63}$ represents an alkyl group; $Y_{61}$ represents a hydrogen atom, and $Y_{52}$, $Y_{62}$ and $Y_{63}$ each represents a halogen atom.

11. The silver halide photographic emulsion of claim 1, in which the sensitizing dye represented by the General Formula (I) and the sensitizing dye represented by the General Formula (II) each is incorporated in an amount of about $2 \times 10^{-6}$ mol to $1 \times 10^{-3}$ mol per mol of silver halide.

12. The silver halide photographic emulsion of claim 11, in which the sensitizing dye represented by the General Formula (I) is incorporated in a molar of 1:20 to 20:1 to the sensitizing dye represented by the General Formula (II).

13. The silver halide photographic emulsion of claim 1, additionally containing a yellow forming coupler.

14. The silver halide photographic emulsion of claim 4, additionally containing a yellow forming coupler.

15. The silver halide photographic emulsion of claim 7, additionally containing a yellow forming coupler.

16. A photographic material comprising a support having thereon the photographic emulsion of claim 1.

17. A color photographic light-sensitive material comprising at least two differently sensitized silver halide emulsion layers, at least one of which contains a coupler and at least one of which consists of the photographic emulsion of claim 1.

* * * * *